United States Patent
Hsiao et al.

(10) Patent No.: US 9,473,021 B2
(45) Date of Patent: Oct. 18, 2016

(54) PARALLEL-CONNECTED POWER CONVERSION SYSTEM OF MULTI-PHASE GENERATOR AND METHOD OF OPERATING THE SAME

(71) Applicant: DELTA ELECTRONICS, INC., Guishan Township (TW)

(72) Inventors: Chih-Hung Hsiao, Guishan Township (TW); Jo-Fang Wei, Guishan Township (TW); Li-Wei Hsiao, Guishan Township (TW)

(73) Assignee: DELTA ELECTRONICS, INC. (TW)

( * ) Notice: Subject to any disclaimer, the term of this patent is extended or adjusted under 35 U.S.C. 154(b) by 240 days.

(21) Appl. No.: 14/314,318

(22) Filed: Jun. 25, 2014

(65) Prior Publication Data

US 2015/0194877 A1 Jul. 9, 2015

(30) Foreign Application Priority Data

Jan. 3, 2014 (CN) .......................... 2014 1 0008136

(51) Int. Cl.
| | |
|---|---|
| *H02M 1/42* | (2007.01) |
| *H02M 3/07* | (2006.01) |
| *H02J 3/38* | (2006.01) |
| *H02M 7/23* | (2006.01) |

(52) U.S. Cl.
CPC .................. *H02M 3/07* (2013.01); *H02J 3/38* (2013.01); *H02M 1/4225* (2013.01); *H02M 7/23* (2013.01); *Y02B 70/126* (2013.01)

(58) Field of Classification Search
CPC ........... H02M 1/4216; H02M 1/4225; H02M 1/4223; H02M 7/23; H02M 7/2176; H02J 3/38; H02J 3/382; H02J 3/383; H02J 3/386; H02J 3/46; H02J 3/48; H02J 3/50
USPC .................... 363/13, 65, 67, 69, 70
See application file for complete search history.

(56) References Cited

U.S. PATENT DOCUMENTS

| | | | | |
|---|---|---|---|---|
| 5,956,244 A | * | 9/1999 | Rehm ..................... | H02M 7/17 363/44 |
| 6,385,057 B1 | * | 5/2002 | Barron ................ | H02M 1/4208 363/17 |
| 2005/0276082 A1 | * | 12/2005 | Panda ................. | H02M 1/4216 363/70 |
| 2007/0108771 A1 | * | 5/2007 | Jones ...................... | H02P 9/102 290/44 |
| 2009/0244945 A1 | * | 10/2009 | Hatanaka ................. | H02M 7/23 363/127 |
| 2011/0013440 A1 | * | 1/2011 | Mechi .................. | H02M 1/4216 363/152 |
| 2012/0230070 A1 | * | 9/2012 | Chen ....................... | H02M 1/15 363/56.02 |
| 2013/0077362 A1 | * | 3/2013 | Kumar ................ | H02M 1/4225 363/49 |
| 2013/0314038 A1 | * | 11/2013 | Kardolus ............ | B60L 11/1812 320/109 |
| 2013/0328309 A1 | * | 12/2013 | Fujii ..................... | F03D 7/0272 290/44 |

* cited by examiner

*Primary Examiner* — Jessica Han
*Assistant Examiner* — David A. Singh
(74) *Attorney, Agent, or Firm* — Hauptman Ham, LLP (57) ABSTRACT

A parallel-connected power conversion system of a multi-phase generator configured to provide a power factor correction for a multi-phase generator. The parallel-connected power conversion system includes a parallel-connected power conversion apparatus and a control unit. The parallel-connected power conversion apparatus has a plurality of power conversion units connected in parallel to each other. The parallel-connected power conversion apparatus receives a plurality of generator currents and a plurality of generator voltages generated from the multi-phase generator, and outputs a DC voltage. The control unit generates a plurality of control signals to correspondingly control the power conversion units so that the generator currents linearly follow the generator voltages, therefore the power factor correction of the multi-phase generator is achieved.

14 Claims, 9 Drawing Sheets

PARALLEL-CONNECTED POWER CONVERSION SYSTEM OF MULTI-PHASE GENERATOR AND METHOD OF OPERATING THE SAME

BACKGROUND

1. Technical Field

The present invention generally relates to a power conversion system of a multi-phase generator and a method of operating the same, and more particularly to a parallel-connected power conversion system of a multi-phase generator with a power factor correction function and a method of operating the same.

2. Description of Related Art

Figure 1:
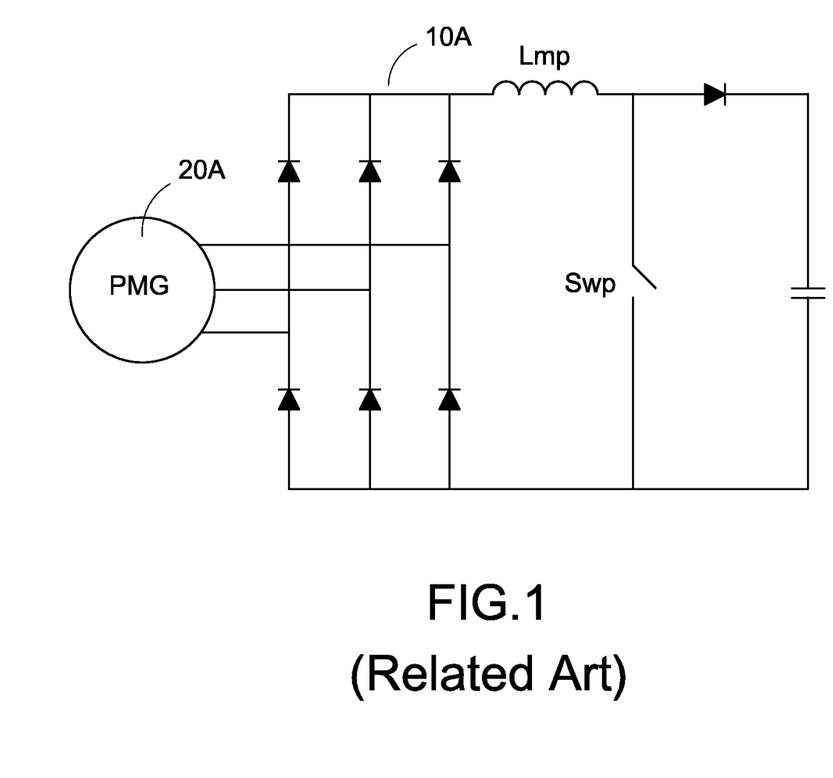
FIG. 1 is a schematic circuit diagram of a related art power generation system with a passive rectifying converter.

At present, the common converters of the power generation system can be roughly divided into two system structures: a passive rectification structure and an active rectification structure. Reference is made to FIG. 1, which is a schematic circuit diagram of a related art power generation system with a passive rectifying converter. The power generation system has a passive full-bridge rectifier 10A electrically coupled to a permanent magnet generator (PMG) 20A. The passive full-bridge rectifier 10A is provided to convert a three-phase AC voltage outputted from the permanent magnet generator 20A into a single-phase DC voltage, and also an inductance element Lmp and a switch element Swp are operated to implement the power conversion. For the power generation system with the passive rectifier, the major advantage thereof is that the overall efficiency is maximal because only one drive switch is switched to achieve the power conversion and the caused conversion losses are very small. Particularly, the smaller power generators or lower wind speed operations are adopted. However, the passive rectifying structure cannot actively control the power factor. Also, the ripple torque coupled from the output ripple current generated from the permanent magnet generator 20A causes vibration and noises because the passive full-bridge rectifier 10A can only obtain peak-voltage energy of the three-phase voltage.

Figure 2:
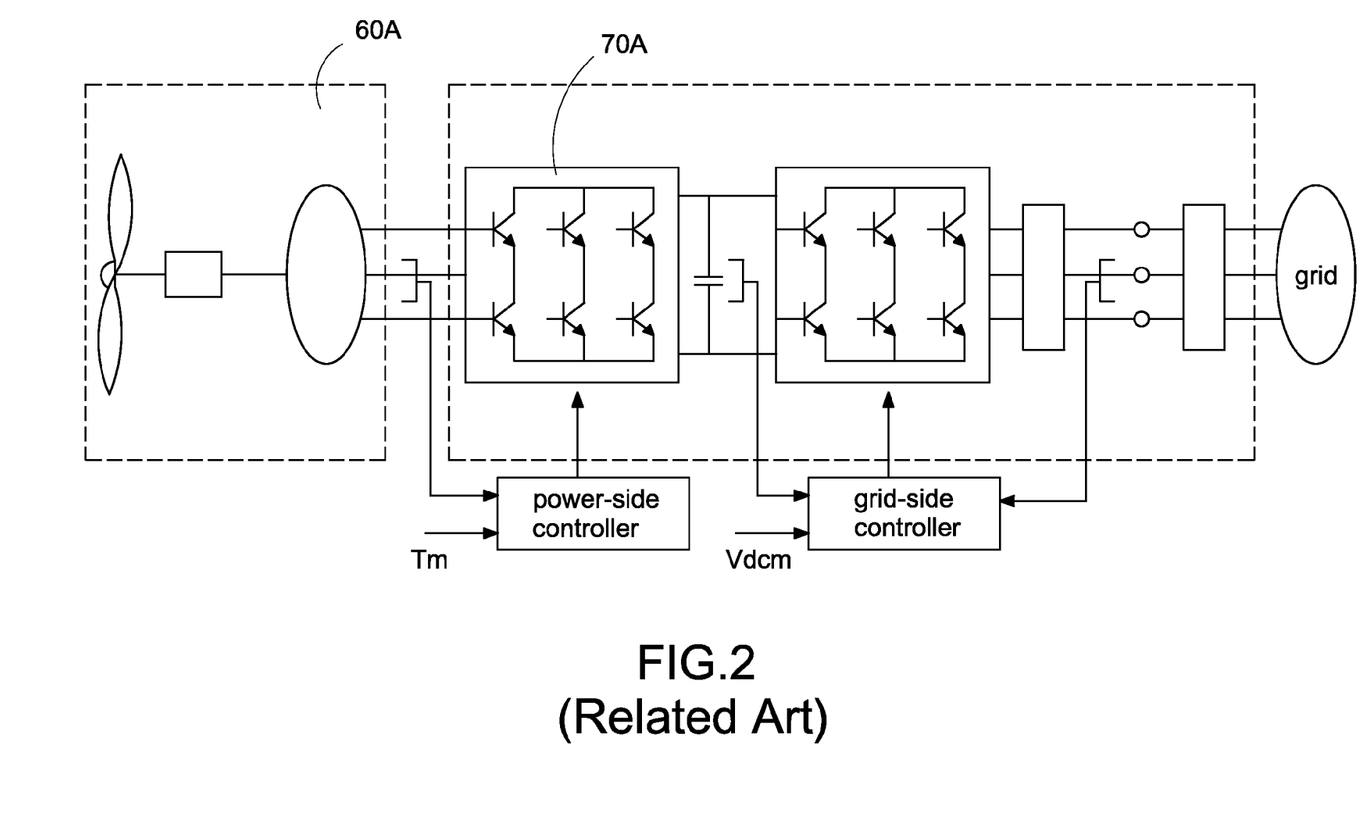
FIG. 2 is a schematic circuit diagram of a related art power generation system with an active rectifying converter.

Reference is made to FIG. 2 which is a schematic circuit diagram of a related art power generation system with an active rectifying converter. There are six active switches and three passive inductors installed in a power side converter 70A. In addition, a position detector installed on a rotor of the generator 60A is provided to acquire instantaneous rotation speed and non-fixed frequency and phase. Accordingly, the frequencies with same frequency and phase following the fundamental wave are required for the instantaneous rotation speed control and the SVPWM (space vector PWM) control to complete the power conversion. Further, the full-voltage power can be implemented because the controller used in the active rectifying structure can synchronously provide power conversion followed by the three-phase AC voltage. However, it is unfavorable for controllers to provide power conversion for various permanent magnet generators since the six active switches need to be simultaneously driven to result in complicated controls and larger power losses.

Especially, because of frequent variation in wind speed and wind direction, the wind power is more unstable compared to the electricity power generated from the electric grids. In addition, it is very difficult to implement the power factor control for the unstable power source.

Accordingly, it is desirable to provide a parallel-connected power conversion system of a multi-phase generator and a method of operating the same to overcome difficulty of controlling the power factor for the unstable power source by low-loss and simple-control designs.

SUMMARY

An object of the present invention is to provide a parallel-connected power conversion system of a multi-phase generator so that a power factor correction for the externally connected multi-phase generator is provided to solve the above-mentioned problems. Accordingly, the parallel-connected power conversion system includes a parallel-connected power conversion apparatus and a control unit. The parallel-connected power conversion apparatus has a plurality of power conversion units connected in parallel to each other, and receives a plurality of generator currents and a plurality of generator voltages generated from the multi-phase generator to output a DC voltage. The control unit has an outer control loop and an inner control loop. The outer control loop receives the DC voltage and the generator voltages to output at least one current operation command. The inner control loop receives the generator currents, the at least one current command, and a plurality of voltage operation commands to generate a plurality of control signals to correspondingly control the power conversion units so that the generator currents linearly follow the generator voltages, therefore the power factor correction of the multi-phase generator is achieved.

Another object of the present invention is to provide a method of operating a parallel-connected power conversion system of a multi-phase generator so that a power factor correction for the externally connected multi-phase generator is provided to solve the above-mentioned problems. Accordingly, the method includes steps of: (a) providing a parallel-connected power conversion apparatus, the parallel-connected power conversion apparatus has a plurality of power conversion units connected in parallel to each other, and receives a plurality of generator currents and a plurality of generator voltages generated from the multi-phase generator to output a DC voltage; (b) providing a control unit, the control unit has an outer control loop and an inner control loop; (c) receiving the DC voltage and the generator voltages by the outer control loop to output at least one current operation command; and the generator currents, the at least one current command, and a plurality of voltage operation commands are received by the inner control loop to generate a plurality of control signals; and (d) correspondingly controlling the power conversion units by the control signals so that the generator currents linearly follow the generator voltages to correct the power factor of the multi-phase generator.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWINGS

The features of the present invention believed to be novel are set forth with particularity in the appended claims. The present invention itself, however, may be best understood by reference to the following detailed description of the present invention, which describes an exemplary embodiment of the present invention, taken in conjunction with the accompanying drawings, in which:

DETAILED DESCRIPTION

Reference will now be made to the drawing figures to describe the present invention in detail.

Figure 3A:
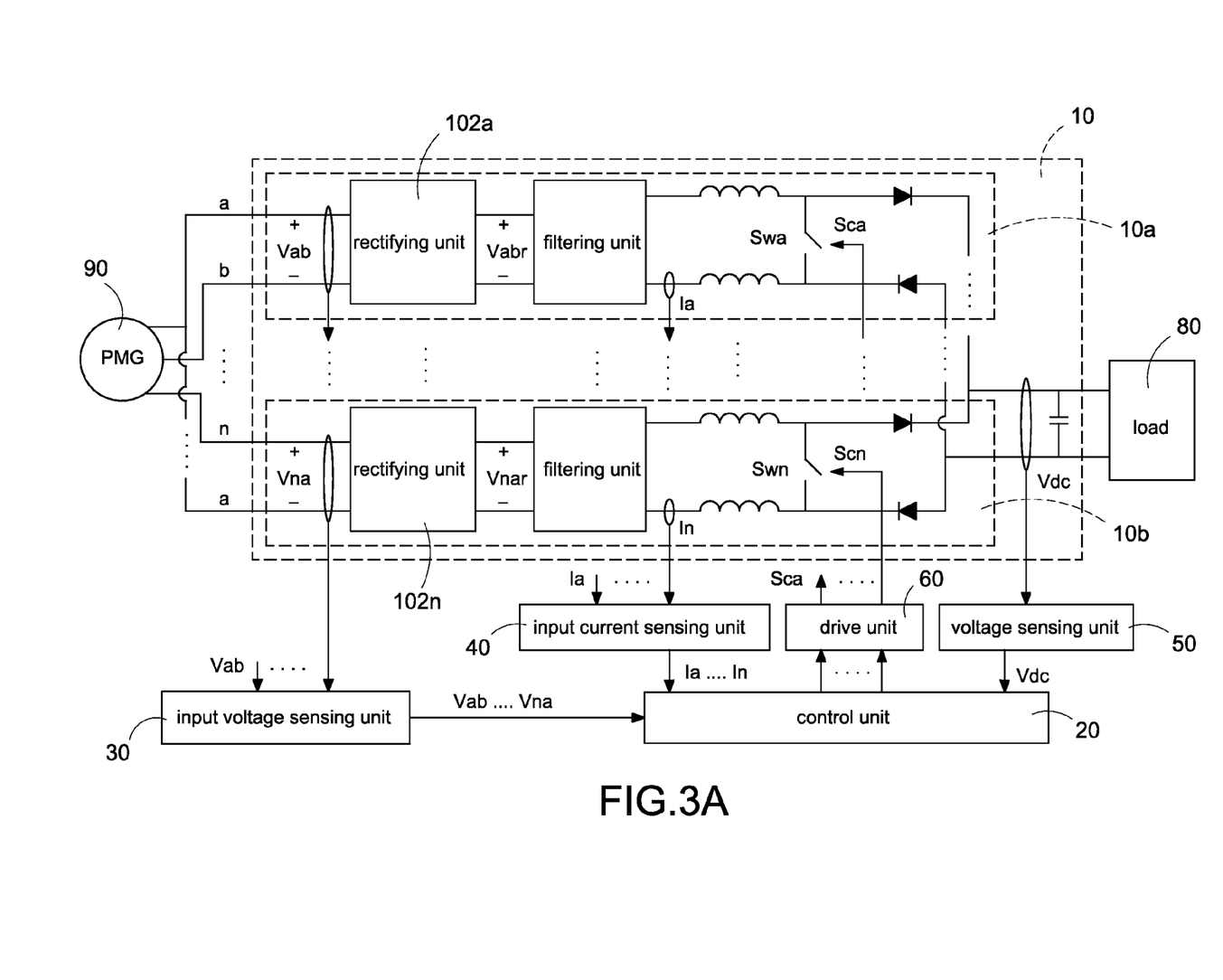
FIG. 3A is a schematic circuit block diagram of a parallel-connected power conversion system of a multi-phase generator according to a first embodiment of the present invention.

Reference is made to FIG. 3A which is a schematic circuit block diagram of a parallel-connected power conversion system of a multi-phase generator according to a first embodiment of the present invention. The parallel-connected power conversion system provides a power factor correction to a multi-phase generator 90. In particular, the multi-phase generator 90 is a multi-phase permanent magnet generator (PMG). The multi-phase generator 90 is driven by an external force, such as wind power, hydraulic power, vapor power, or even human power. However, the embodiments are only exemplified but are not intended to limit the scope of the invention. For convenience, the wind power is exemplified to further demonstrate the present invention. In addition, the controller used in this present invention is a power conversion system which provide electromechanical energy coupling to the stator windings of the generator, and the controller can be installed inside the generator.

The parallel-connected power conversion system of the multi-phase generator includes a parallel-connected power conversion apparatus 10 and a control unit 20. The parallel-connected power conversion apparatus 10 includes a plurality of power conversion units 10a,10b, . . . , 10n connected in parallel to each other, and receives a plurality of generator currents Ia,Ib, . . . , In and a plurality of generator voltages Vab,Vbc, . . . , Vna generated from the multi-phase generator to output a DC voltage Vdc. The "multi-phase" means that the generator is not limited to be a three-phase generator, and even the phase number of the generator is greater than three. In addition, the multi-phase power generated from the generator is different from the conventional three-phase power generated from the electric grid. In particular, the symbol "a" indicates a-phase voltage or current, the symbol "b" indicates b-phase voltage or current, and the symbol "n" indicates n-phase voltage or current; in which, n is greater than or equal to 3.

Especially, multi-phase inductors at the power side of the parallel-connected power conversion apparatus 10 are used to achieve the power conversions, and the operations of energy storing and energy releasing of the inductors are implemented by the switch units after a rectification operation. More specifically, the currents flowing through the inductors linearly follow the corresponding AC voltages when the inductors with zero initial energy are operated in the energy-storing condition or the energy-releasing condition during a fixed cycle. In other words, the inductor currents are proportionally varied with the polarity and magnitude of the AC voltages after the inductor currents are fully discharged during one cycle and enter next cycle.

The control unit 20 includes an outer control loop 201 and an inner control loop 202. The outer control loop 201 receives the DC voltage Vdc and the generator voltages Vab,Vbc, . . . , Vna to output at least one current operation command I*. The inner control loop 202 receives the generator currents Ia,Ib, . . . , In, the at least one current operation command I*, and receives a plurality of voltage operation commands Va*,Vb*, . . . , Vn* to generate a plurality of control signals Sca,Scb, . . . , Scn to correspondingly control the power conversion units 10a,10b, . . . , 10n so that the generator currents Ia,Ib, . . . , In linearly follow the generator voltages Vab,Vbc, . . . , Vna, therefore the power factor correction of the multi-phase generator is achieved. Especially, each control signal Sca,Scb, . . . , Scn is pulse width modulation (PWM) signal, and also the parallel-connected power conversion system further includes a PWM drive unit 60 to provide the control signals Sca,Scb, . . . , Scn to correspondingly control the switch units Swa,Swb, . . . , Swn of the power conversion units 10a,10b, . . . , 10n.

More specifically, in this embodiment, the parallel-connected power conversion system of the multi-phase generator further includes an input voltage sensing unit 30, an input current sensing unit 40, and a voltage sensing unit 50. The input voltage sensing unit 30 senses the generator voltages Vab,Vbc, . . . , Vna and transmits the generator voltages Vab,Vbc, . . . , Vna to the control unit 20. The input current sensing unit 40 senses the generator currents Ia,Ib, . . . , In and transmits the generator currents Ia,Ib, . . . , In to the control unit 20. The voltage sensing unit 50 senses the DC voltage Vdc and transmits the DC voltage Vdc to the control unit 20.

Figure 4A:
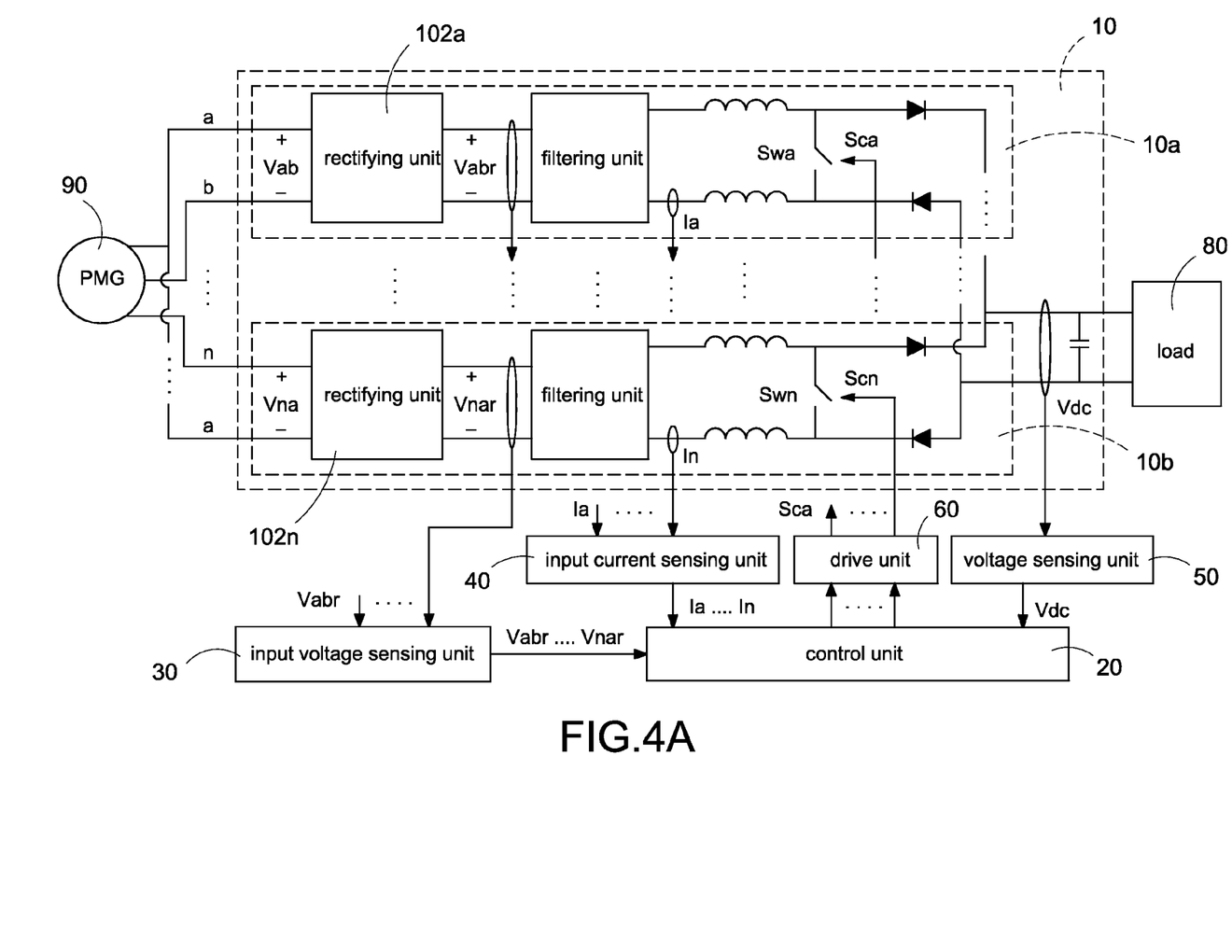
FIG. 4A is a schematic circuit block diagram of the parallel-connected power conversion system of the multi-phase generator according to a second embodiment of the present invention.

Reference is made to FIG. 4A which is a schematic circuit block diagram of the parallel-connected power conversion system of the multi-phase generator according to a second embodiment of the present invention. The major difference between the second embodiment and the first embodiment is that the input voltage sensing unit 30 is provided to sense the generator voltages Vab,Vbc, . . . , Vna which are rectified. More specifically, the parallel-connected power conversion apparatus 10 has a plurality of rectifying units 102a, 102b, . . . , 102n, and each power conversion unit 10a,10b, . . . , 10n correspondingly has one rectifying unit 102a,102b, . . . , 102n. In addition, each rectifying unit 102a,102b, . . . , 102n correspondingly receives one generator voltages Vab,Vbc, . . . , Vna to generate a rectified generator voltage Vabr,Vbcr, . . . , Vnar. As mentioned above, the major difference between the second embodiment and the first embodiment is that the input voltage sensing unit 30 is used to sense the rectified generator voltages Vabr,Vbcr, . . . , Vnar and transmits the rectified generator voltages Vabr,Vbcr, . . . , Vnar to the control unit 20. In addition, the input current sensing unit 40 is provided to sense the generator currents Ia,Ib, . . . , In and transmit the generator currents Ia,Ib, . . . , In to the control unit 20. The voltage sensing unit 50 is provided to sense the DC voltage Vdc and transmit the DC voltage Vdc to the control unit 20. The detailed operation of the parallel-connected power conversion system of the multi-phase generator, and more particularly to the control unit 20 thereof will be described hereinafter as follows.

Figure 5:
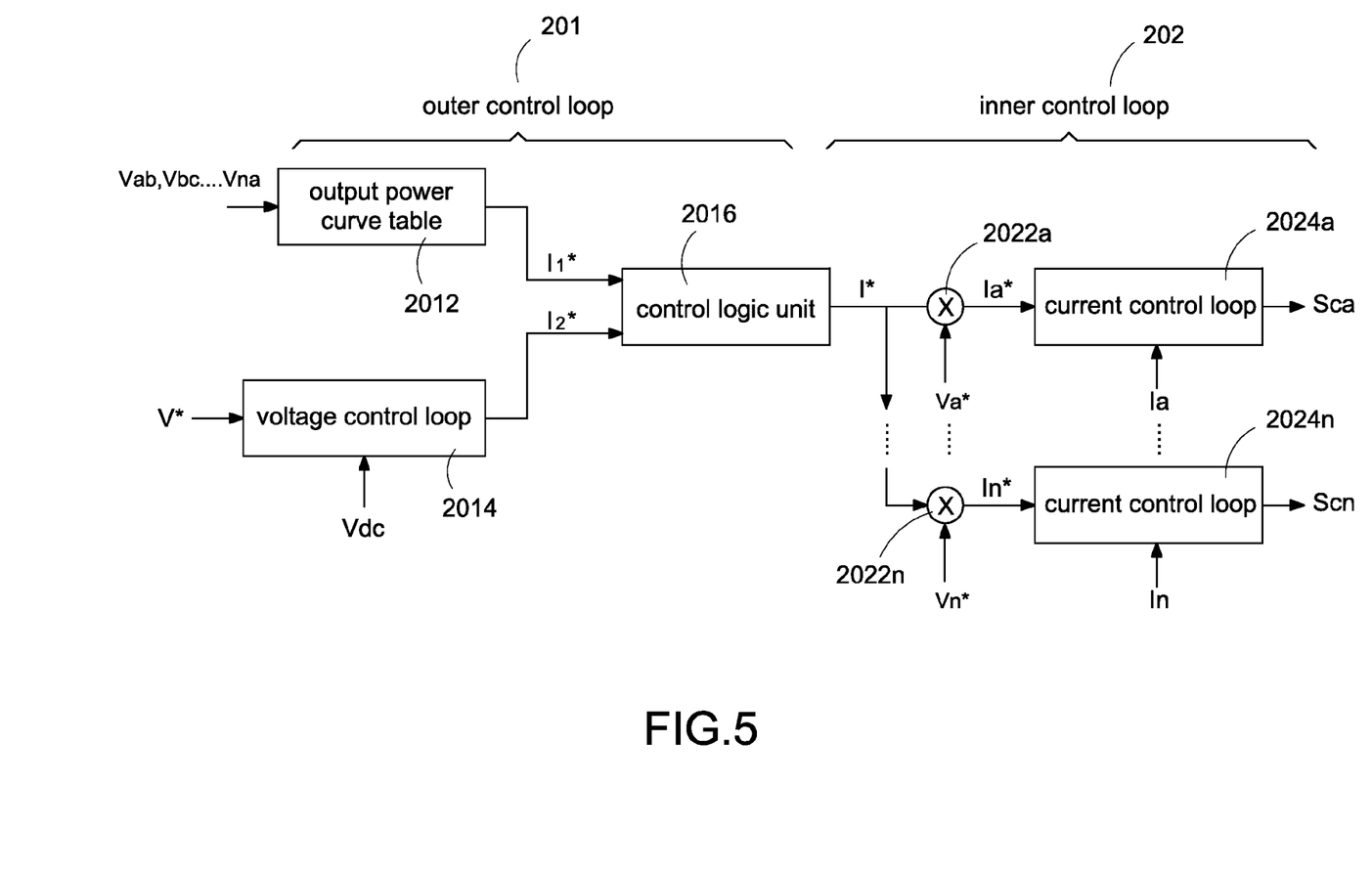
FIG. 5 is a schematic block diagram of the control unit according to the present invention.

Reference is made to FIG. 5 which is a schematic block diagram of the control unit according to the present invention. As mentioned above, the control unit 20 includes the outer control loop 201 and the inner control loop 202. The outer control loop 201 has an output power curve table 2012 (also referred to as a voltage-current curve table), a voltage control loop 2014, and a control logic unit 2016. As shown in FIG. 3A, the output power curve table 2012 receives the generator voltages Vab,Vbc, . . . , Vna to output a first current command I1*. As shown in FIG. 4A, the output power curve table 2012 receives the rectified generator voltages Vabr,Vbcr, . . . , Vnar to output a first current command I1*. The voltage control loop 2014 receives the DC voltage Vdc and a voltage command V*, and compares the DC voltage Vdc to the voltage command V* to output a second current command I2*. The control logic unit 2016 receives the first current command I1* and the second current command I2* to output the first current command I1* or the second current command I2* to be the current operation command I*.

The inner control loop 202 has a plurality of multiplying units 2022a,2022b, . . . , 2022n and a plurality of current control loops 2024a,2024b, . . . , 2024n. Each multiplying unit 2022a,2022b, . . . , 2022n receives the current operation command I* and one of the voltage operation commands Va*,Vb*, . . . , Vn*, and calculate the product between the current operation command I* and the corresponding voltage operation command Va*,Vb*, . . . , Vn* to generate a current command Ia*,Ib*, . . . , In*. Each current control loop 2024a,2024b, . . . , 2024n correspondingly receives one of the current commands Ia*,Ib*, . . . , In* and one of the generator currents Ia,Ib, . . . , In to generate a control signal Sca,Scb, . . . , Scn. In particular, the control unit 20 correspondingly controls the power conversion units 10a, 10b, . . . , 10n by the control signals Sca,Scb, . . . , Scn.

Figure 3B:
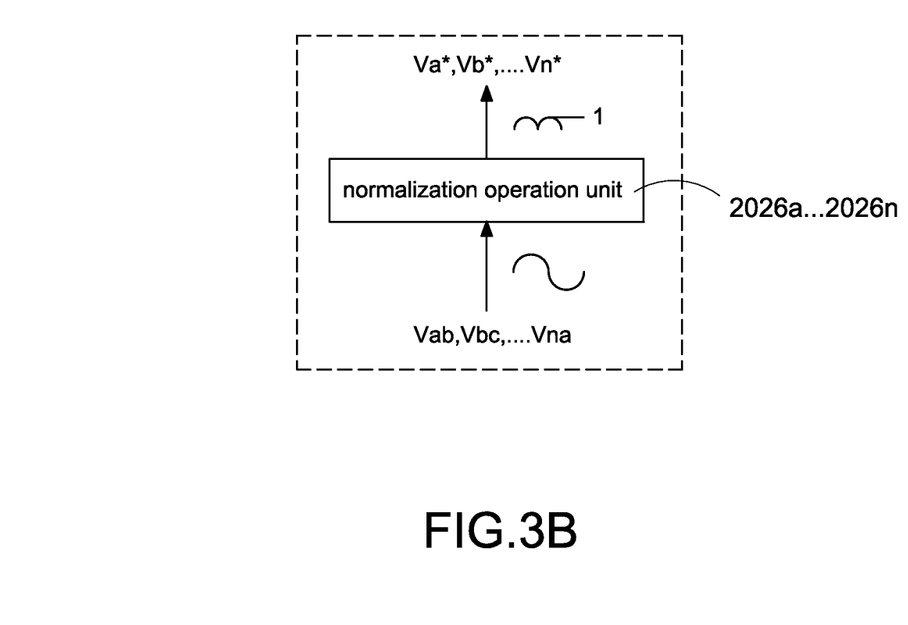
FIG. 3B is a schematic block diagram of a normalization operation unit of a control unit according to a first embodiment of the present invention.

Reference is made to FIG. 3B which is a schematic block diagram of a normalization operation unit of a control unit according to a first embodiment of the present invention. The control unit 20 further includes a plurality of normalization operation units 2026a,2026b, . . . , 2026n. Each normalization operation unit 2026a,2026b, . . . , 2026n is connected to one of the multiplying units 2022a, 2022b, . . . , 2022n, and correspondingly receives one of the generator voltages Vab,Vbc, . . . , Vna to correspondingly generate the voltage operation commands Va*,Vb*, . . . , Vn*. The normalization operation units 2026a,2026b, . . . , 2026n provide normalization operations to the received generator voltages Vab,Vbc, . . . , Vna. More specifically, each normalization operation unit 2026a,2026b, . . . , 2026n normalizes the correspondingly received generator voltage Vab,Vbc, . . . , Vna based on the maximum value of the generator voltage Vab,Vbc, . . . , Vna. In other words, the maximum value of the voltage operation commands Va*, Vb*, . . . , Vn* generated from the normalization operation units 2026a,2026b, . . . , 2026n is equal to 1 after the normalization operations. For example, it is assumed that the maximum value of the generator voltage Vab is 140 volts so that the voltage operation command Va* is equal to 1. If the generator voltage Vab is 70 volts, the corresponding voltage operation command Va* is equal to 0.5. In addition, it is assumed that the maximum value of the generator voltage Vbc is 70 volts so that the voltage operation command Vb* is equal to 1. If the generator voltage Vbc is 70 volts, the corresponding voltage operation command Vb* is equal to 0.4375. Accordingly, the multiplying units 2022a, 2022b, . . . , 2022n receive the current operation command I* and the voltage operation commands Va*,Vb*, . . . , Vn* and calculate the product between the current operation command I* and the voltage operation commands Va*,Vb*, . . . , Vn* to generate the current commands Ia*,Ib*, . . . , In*. Finally, the current control loops 2024a, 2024b, . . . , 2024n correspondingly receive the current commands Ia*,Ib*, . . . , In* and the generator currents Ia,Ib, . . . , In to correspondingly generate the control signals Sca,Scb, . . . , Scn to correspondingly control the power conversion units 10a,10b, . . . , 10n so that the generator currents linearly follow the generator voltages, therefore the power factor correction of the multi-phase generator 90 is achieved. More specifically, because the generator voltages Vab,Vbc, . . . , Vna are non-rectified sinusoidal waveforms, the normalization operation units 2026a,2026b, . . . , 2026n can execute the absolute operation for the non-rectified generator voltages Vab,Vbc, . . . , Vna to achieve the equivalent operation of rectifying the generator voltages Vab,Vbc, . . . , Vna. In addition, after the normalization operations, the values of multiplying the current operation command I* with the normalized voltage operation commands Va*,Vb*, . . . , Vn* are significantly reduced to significantly reduce the current commands Ia*,Ib*, . . . , In*, thus avoiding malfunction and even damage of the current control loops 2024a,2024b, . . . , 2024n from the excessive current commands Ia*,Ib*, . . . , In*.

Figure 4B:
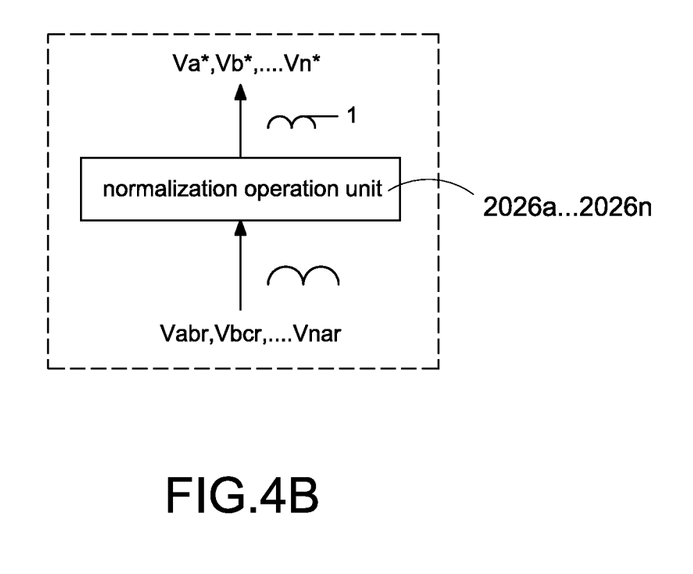
FIG. 4B is a schematic block diagram of the normalization operation unit of the control unit according to a second embodiment of the present invention.

Reference is made to FIG. 4B which is a schematic block diagram of the normalization operation unit of the control unit according to a second embodiment of the present invention. The control unit 20 further includes a plurality of normalization operation units 2026a,2026b, . . . , 2026n. Each normalization operation unit 2026a,2026b, . . . , 2026n is connected to one of the multiplying units 2022a, 2022b, . . . , 2022n, and correspondingly receives one of the rectified generator voltages Vabr,Vbcr, . . . , Vnar to correspondingly generate the voltage operation commands Va*, Vb*, . . . , Vn*. The normalization operation units 2026a, 2026b, . . . , 2026n provide normalization operations to the received rectified generator voltages Vabr,Vbcr, . . . , Vnar. More specifically, each normalization operation unit 2026a, 2026b, . . . , 2026n normalizes the correspondingly received rectified generator voltage Vabr,Vbcr, . . . , Vnar based on the maximum value of the rectified generator voltage Vabr, Vbcr, . . . , Vnar. In other words, the maximum value of the voltage operation commands Va*,Vb*, . . . , Vn* generated from the normalization operation units 2026a,2026b, . . . , 2026n is equal to 1 after the normalization operations. Accordingly, the multiplying units 2022a,2022b, . . . , 2022n receive the current operation command I* and the voltage operation commands Va*,Vb*, . . . , Vn* and calculate the product between the current operation command I* and the voltage operation commands Va*,Vb*, . . . , Vn* to generate the current commands Ia*,Ib*, . . . , In*. Finally, the current control loops 2024a,2024b, . . . , 2024n correspondingly receive the current commands Ia*,Ib*, . . . , In* and the generator currents Ia,Ib, . . . , In to correspondingly generate the control signals Sca,Scb, . . . , Scn to correspondingly control the power conversion units 10a,10b, . . . , 10n so that the generator currents linearly follow the generator voltages, therefore the power factor correction of the multi-phase generator 90 is achieved.

Figure 6:
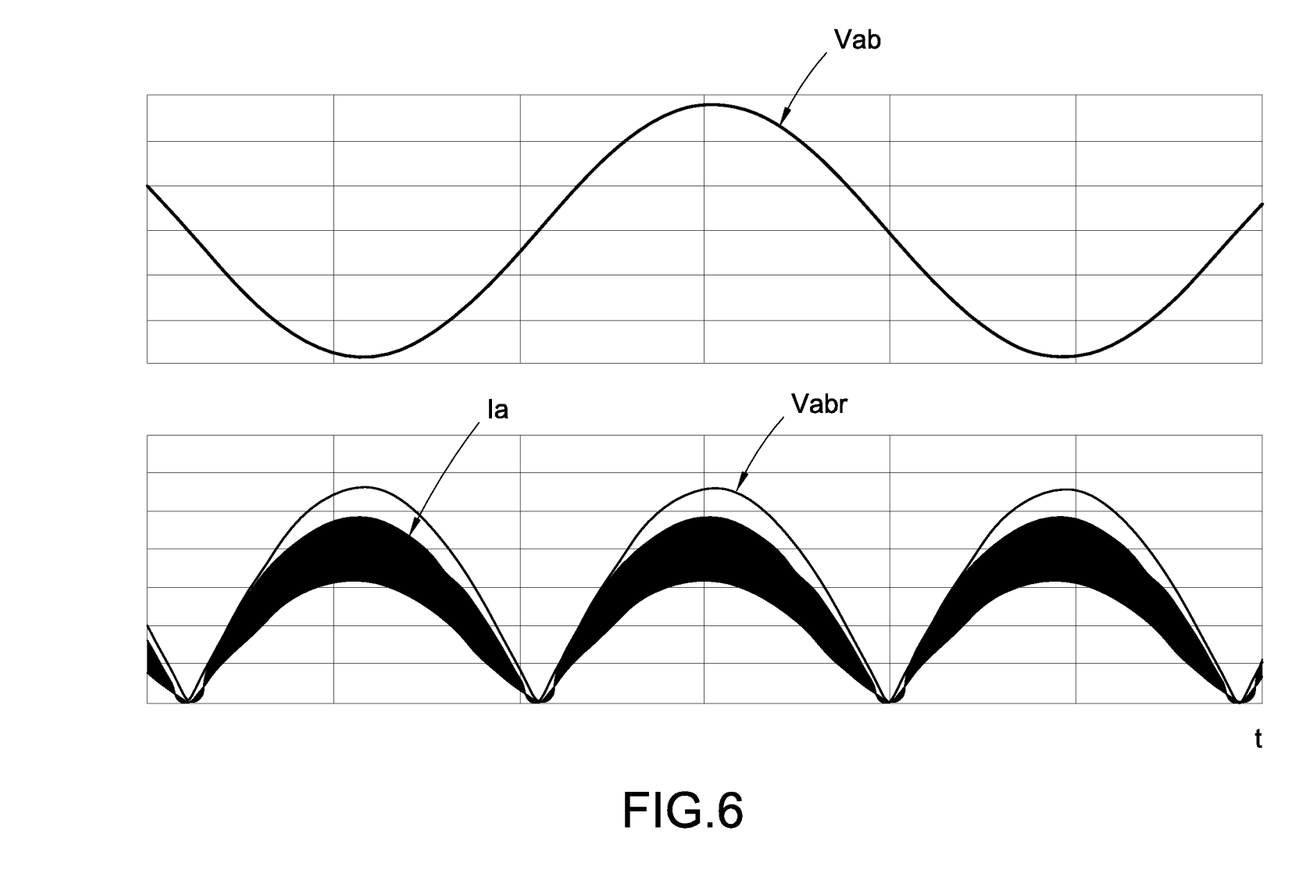
FIG. 6 is a waveform graph of generator voltages and generator currents of the parallel-connected power conversion system of the multi-phase generator according to present invention.

Reference is made to FIG. 6 which is a waveform graph of generator voltages and generator currents of the parallel-connected power conversion system of the multi-phase generator according to present invention. The upper part of FIG. 6 illustrates the generator voltage Vab and the lower part of FIG. 6 illustrates the relationship between the rectified generator voltage Vabr and the generator current Ia. As shown in the lower part of FIG. 6, after calculation operations of the outer control loop 201 and the inner control loop 202, each phase of the generator currents Ia,Ib, . . . , In linearly follow the in-phase rectified generator voltages Vabr,Vbcr, . . . , Vnar, therefore the power factor correction of the multi-phase generator 90 is achieved.

Figure 7:
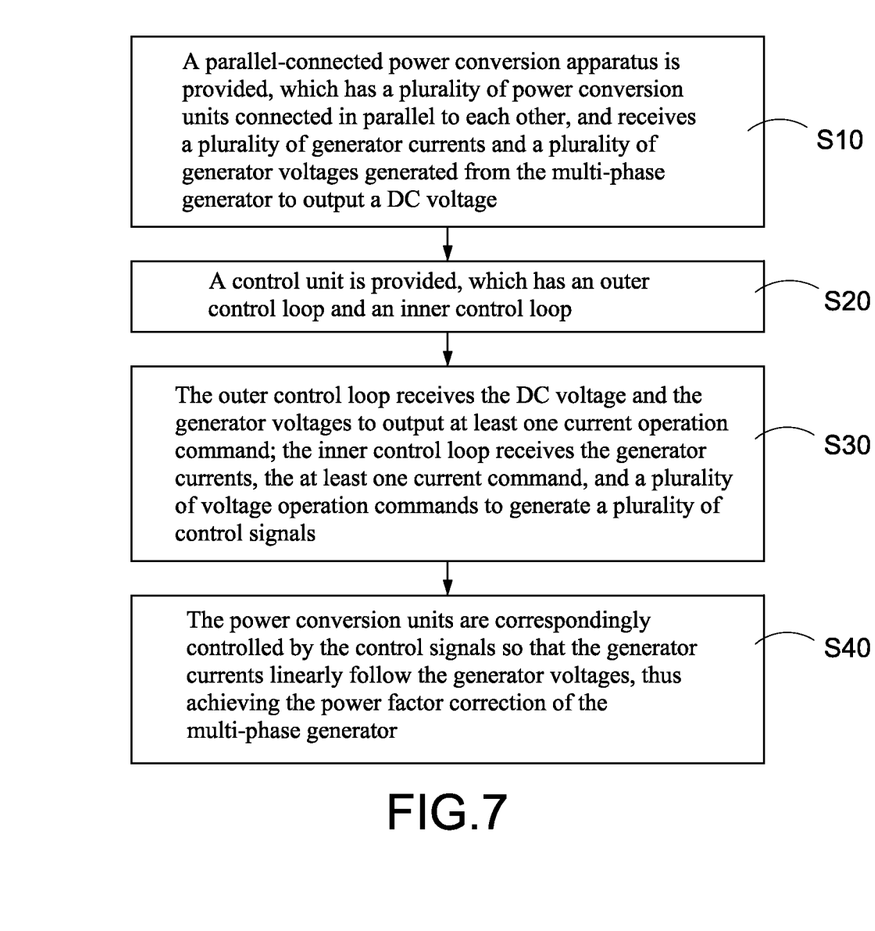
FIG. 7 is a flowchart of a method of operating the parallel-connected power conversion system of the multi-phase generator according to the present invention

Reference is made to FIG. 7 which is a flowchart of a method of operating the parallel-connected power conversion system of the multi-phase generator according to the present invention. The parallel-connected power conversion system is configured to provide a power factor correction for a multi-phase generator which is externally connected. The method includes following steps: First, a parallel-connected power conversion apparatus is provided. The parallel-connected power conversion apparatus has a plurality of power conversion units connected in parallel to each other, and receives a plurality of generator currents and a plurality of generator voltages generated from the multi-phase generator to output a DC voltage (S10). Afterward, a control unit is provided. The control unit has an outer control loop and an inner control loop (S20). The outer control loop receives the DC voltage and the generator voltages to output at least one current operation command. The inner control loop receives the generator currents, the at least one current command, and a plurality of voltage operation commands to generate a plurality of control signals (S30).

More specifically, the outer control loop has an output power curve table (also referred to as a voltage-current curve table), a voltage control loop, and a control logic unit 2016. The output power curve table receives the generator voltages to output a first current command. Also, the output power curve table receives the rectified generator voltages to output the first current command. The voltage control loop receives the DC voltage and a voltage command, and compares the DC voltage to the voltage command to output a second current command. The control logic unit receives the first current command and the second current command to output the first current command or the second current command to be the current operation command.

The inner control loop has a plurality of multiplying units and a plurality of current control loops. Each multiplying unit receives the current operation command and one of the voltage operation commands, and calculates the product between the current operation command and the corresponding voltage operation command to generate a current command. Each current control loop correspondingly receives one of the current commands and one of the generator currents to generate a control signal. In particular, the control unit correspondingly controls the power conversion units by the control signals.

The control unit further includes a plurality of normalization operation units. Each normalization operation unit is connected to one of the multiplying units, and correspondingly receives one of the generator voltages to correspondingly generate the voltage operation commands. The normalization operation units provide normalization operations to the received generator voltages. More specifically, each normalization operation unit normalizes the correspondingly received rectified generator voltage based on the maximum value of the rectified generator voltage. In other words, the maximum value of the voltage operation commands generated from the normalization operation units is equal to 1 after the normalization operations. Accordingly, the multiplying units receive the current operation command and the voltage operation commands and calculate the product between the current operation command and the voltage operation commands to generate the current commands. Finally, the current control loops correspondingly receive the current commands and the generator currents to correspondingly generate the control signals to correspondingly control the power conversion units so that the generator currents linearly follow the generator voltages, therefore the power factor correction of the multi-phase generator is achieved.

Finally, the power conversion units are correspondingly controlled by the control signals so that the generator currents linearly follow the generator voltages, therefore the power factor correction of the multi-phase generator (S40) is achieved.

In conclusion, the present invention has following advantages:

1. The designs of low power consumption and simple control of the power conversion system with independent frequency and phase are provided to implement the power factor correction function;

2. The multi-phase structure (unlike the three-phase power generated from the electric grid) of the parallel-connected power conversion system and the method of operating the same can be used to broader and more flexible applications; and 3. After the normalization operations, the values of multiplying the current operation command I* with the normalized voltage operation commands Va*,Vb*, . . . , Vn* are significantly reduced to significantly reduce the current commands Ia*,Ib*, . . . , In*, thus avoiding malfunction and even damage of the current control loops 2024a, 2024b, . . . , 2024n from the excessive current commands Ia*,Ib*, . . . , In*.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A parallel-connected power conversion system of a multi-phase generator, providing a power factor correction for the externally connected multi-phase generator, the parallel-connected power conversion system comprising:

a parallel-connected power conversion apparatus comprising a plurality of power conversion units connected in parallel to each other, and configured to receive a plurality of generator currents and a plurality of generator voltages generated from the multi-phase generator to output a DC voltage; and a control unit comprising:

an outer control loop configured to receive the DC voltage and the generator voltages to output at least one current operation command; and an inner control loop configured to receive the generator currents, the at least one current command, and a plurality of voltage operation commands to generate a plurality of control signals to correspondingly control the power conversion units so that the generator currents linearly follow the generator voltages to correct the power factor of the multi-phase generator;

wherein the inner control loop comprises:
a plurality of multiplying units, each multiplying unit is configured to receive the current operation command and one of the voltage operation commands, and calculate the product between the current operation command and the voltage operation command to generate a current command; and
a plurality of current control loops, each current control loop is configured to correspondingly receive one of the current commands and one of the generator currents to generate a control signal;

wherein the control unit is configured to correspondingly control the power conversion units by the control signals; and wherein the control unit further comprises:
a plurality of normalization operation units, each normalization operation unit is connected to one of the multiplying units and is configured to correspondingly receive one of the generator voltages; the normalization operation units are configured to normalize the generator voltages to correspondingly generate the voltage operation commands.

2. The system as recited in claim 1, wherein the outer control loop comprises:
an output power curve table is configured to receive the generator voltages to output a first current command;
a voltage control loop is configured to receive the DC voltage and a voltage command, and compare the DC voltage to the voltage command to output a second current command; and
a control logic unit is configured to receive the first current command and the second current command, and output the first current command or the second current command to be the current operation command.

3. The system as recited in claim 1, further comprising:
an input voltage sensing unit configured to sense the generator voltages and transmit the generator voltages to the control unit;
an input current sensing unit configured to sense the generator currents and transmit the generator currents to the control unit; and
a voltage sensing unit configured to sense the DC voltage and transmit the DC voltage to the control unit.

4. The system as recited in claim 1, wherein each power conversion unit comprises a switch unit; the control signals are configured to correspondingly control the switch units to control a load operation or a brake operation of the multi-phase generator.

5. The system as recited in claim 4, wherein each control signal is a pulse width modulation signal; the parallel-connected power conversion system further comprises a pulse width modulation drive unit to provide the control signals to correspondingly control the switch units.

6. The system as recited in claim 1, wherein the parallel-connected power conversion system is configured to provide electromechanical energy coupling to stator windings of the multi-phase generator.

7. The system as recited in claim 1, wherein the multi-phase generator is externally connected and driven by wind power, hydraulic power, vapor power, or human power.

8. A method of operating a parallel-connected power conversion system of a multi-phase generator, providing a power factor correction for the multi-phase generator which is externally connected, the method comprising steps of:

(a) providing a parallel-connected power conversion apparatus, the parallel-connected power conversion apparatus having a plurality of power conversion units connected in parallel to each other, and configured to receive a plurality of generator currents and a plurality of generator voltages generated from the multi-phase generator to output a DC voltage;
(b) providing a control unit, the control unit having an outer control loop and an inner control loop;
(c) receiving the DC voltage and the generator voltages by the outer control loop to output at least one current operation command; and receiving the generator currents, the at least one current command, and a plurality of voltage operation commands by the inner control loop to generate a plurality of control signals; and
(d) correspondingly controlling the power conversion units by the control signals so that the generator currents linearly follow the generator voltages to correct the power factor of the multi-phase generator;

wherein in the step (c), the inner control loop comprises:
a plurality of multiplying units, each multiplying unit is configured to receive the current operation command and one of the voltage operation commands, and calculate the product between the current operation command and the voltage operation command to generate a current command; and
a plurality of current control loops, each current control loop is configured to correspondingly receive one of the current commands and one of the generator currents to generate a control signal; and wherein the control unit is configured to correspondingly control the power conversion units by the control signals.

9. The method as recited in claim 8, wherein in the step (c), the outer control loop comprises:
an output power curve table is configured to receive the generator voltages to output a first current command;
a voltage control loop is configured to receive the DC voltage and a voltage command, and compare the DC voltage to the voltage command to output a second current command; and
a control logic unit is configured to receive the first current command and the second current command, and output the first current command or the second current command to be the current operation command.

10. The method as recited in claim 8, wherein the parallel-connected power conversion system further comprises:
an input voltage sensing unit is configured to sense the generator voltages and transmit the generator voltages to the control unit;
an input current sensing unit is configured to sense the generator currents and transmit the generator currents to the control unit; and
a voltage sensing unit is configured to sense the DC voltage and transmit the DC voltage to the control unit.

11. The method as recited in claim 8, wherein each power conversion unit comprises a switch unit; the control signals are configured to correspondingly control the switch units to control a load operation or a brake operation of the multi-phase generator.

12. The method as recited in claim 11, wherein each control signal is a pulse width modulation signal; the parallel-connected power conversion system further comprises a pulse width modulation drive unit to provide the control signals to correspondingly control the switch units.

13. The method as recited in claim 8, wherein the parallel-connected power conversion system is configured to provide electromechanical energy coupling to stator windings of the multi-phase generator.

14. The method as recited in claim 8, wherein the multi-phase generator is externally connected and driven by wind power, hydraulic power, vapor power, or human power.

* * * * *